Patented May 18, 1948

2,441,576

UNITED STATES PATENT OFFICE 2,441,576

AMINO METHYL PHENOLS

Eldon M. Jones and Albert L. Rawlins, Grosse Pointe Woods, and Joseph H. Burckhalter and Walter F. Holcomb, Detroit, Mich., assignors to Parke, Davis & Company, Detroit, Mich., a corporation of Michigan No Drawing. Application April 22, 1944, Serial No. 532,373

5 Claims. (Cl. 260—570.9)

The invention relates to new phenolic diphenyl ethers containing at least one aminomethyl group attached directly to a benzene ring to which a phenolic hydroxyl is also attached. The invention also relates to processes for obtaining these new products.

The compounds of the invention have the general formula

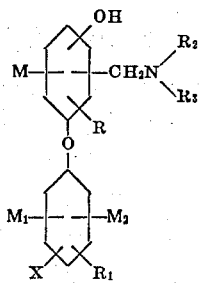

where M, $M_1$, and $M_2$ are members of the class H and

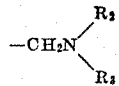

R and $R_1$ are members of the class H, alkylene, halogen and alkyl, $R_2$ is H, alkyl, alkylene or hydroxyalkyl containing not more than six carbon atoms, $R_3$ is alkyl, alkylene or hydroxyalkyl, containing not more than six carbon atoms and X is a member of the class hydrogen, halogen, and hydroxyl.

These compounds can be prepared by several methods.

A.—A phenolic diphenyl ether can be treated with formaldehyde and a non-aromatic amine to cause a transformation which may be represented as follows:

where R, $R_1$, $R_2$, $R_3$, $M_1$, and X have the values already given under the general formula, and where $n$ is one of the integers 1, 2, 3 or 4 and $m$ is 1, 2, 3 or 4.

A variation of this procedure is to cause the formaldehyde and the secondary amine to react in a suitable solvent to form a dialkylaminomethanol or a dialkylaminomethyl alkyl ether, which may or may not be isolated before being treated with a phenolic diphenyl ether to give a product such as is illustrated by formula II.

B.—A phenolic diphenyl ether, illustrated by formula I, can be treated with formaldehyde and an alkaline catalyst, e. g., sodium hydroxide or potassium carbonate, to yield a methylol compound which can react with a primary or secondary amine in the presence of acid to give a substituted aminomethyl diphenyl ether such as is illustrated by formula II.

A variation of this process involves the treatment of the intermediate methylol compound in acetic acid with gaseous hydrogen chloride to form a chloromethyl derivative which may be isolated and treated with a suitable amine.

C.—The carbethoxy ester of a phenolic diphenyl ether, as described by formula I, may be chloromethylated by the procedure of Compt. rend., 197; 256 (1933). This chloromethyl derivative may be treated with an alcoholic solution of a primary or secondary amine and the intermediate thus formed hydrolyzed by refluxing with dilute alkali solution to give compounds represented by formula II above.

These new compounds are useful therapeutic agents, being characterized by their toxicity to bacteria and protozoa. Particularly, they are valuable as antimalarial agents and may be used in the form of their free bases or as salts of mineral acids, such as hydrochloric, hydrobromic, sulfuric, phosphoric, and sulfamic, or as salts of organic acids, such as acetic, propionic, lactic, citric, benzoic, etc.

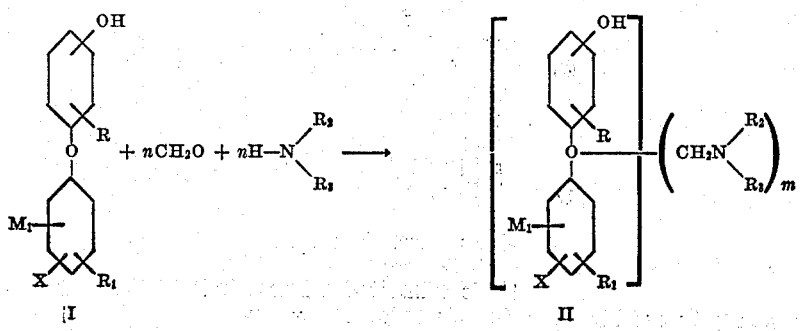

I                II

These substances are also antioxidants and as such are useful as inhibitors.

In order to illustrate this invention the following examples are given, but they are not intended as limitations with respect to the phenols or the amines used or with respect to the conditions for reaction.

EXAMPLE I

*Preparation of 2-diethylaminomethyl 4-phenoxyphenol hydrochloride*

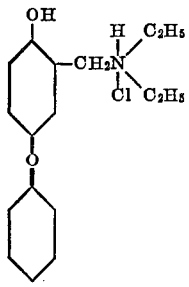

A mixture of 18.6 g. (0.10 mole) of 4-phenoxyphenol, 3.3 g. (0.11 mole) of paraformaldehyde, 8.0 g. (0.11 mole) of diethylamine, and 75 cc. of alcohol is heated in a steam bath for one hour. After most of the volatile material is removed by evaporation, the residue is treated with 50 cc. of concentrated hydrochloric acid and the resulting mixture is extracted with ether. The aqueous layer is separated and made alkaline with ammonia. The precipitated oil is extracted with ether and the extract washed with water and dried over anhydrous sodium sulfate. The ether is removed and the residue treated with an excess of alcoholic hydrogen chloride. Upon standing, a crystalline mass forms. This material is collected and washed with cold alcohol and dry ether; M. P. 161° C. Recrystallization from alcohol-ethyl acetate does not elevate the melting point.

EXAMPLE II

*Preparation of 3,3'-bis(diethylaminomethyl)-4,4'-dihydroxyphenyl ether*

To a solution of 10 g. (0.50 mole) of 4,4'-dihydroxyphenyl ether in 160 cc. of alcohol is added a solution of 35 g. (1.17 moles) of paraformaldehyde and 85 g. (1.17 moles) of diethylamine in 100 cc. of alcohol. The mixture is warmed in a steam bath in an open vessel for two hours. The desired product crystallizes upon cooling. After recrystallization from alcohol, the white crystalline material melts at 96–98° C. This compound which is the free base has the following formula:

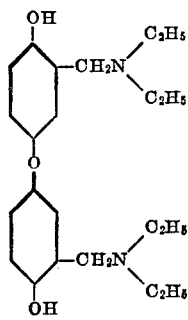

The free base obtained as above may be readily converted into the desired salt by taking up in a suitable solvent and adding an acid as previously described such as hydrochloric, sulfamic, etc.

Instead of using 4,4'-dihydroxyphenyl ether as the starting material, the process may also be carried out with other dihydroxy diphenyl ethers in which the hydroxyl groups are substituted in the following positions 2,4'; 2,3'; 2,2'; 3,3'; 3,4' thereby obtaining in the form of the free base or its acid addition salts the following new compounds:

3,3' - bis (diethylaminomethyl) - 2,4'-dihydroxyphenyl ether
3,4' - bis (diethylaminomethyl) - 2,3'-dihydroxyphenyl ether
3,3' - bis (diethylaminomethyl) - 2,2'-dihydroxyphenyl ether
4,4' - bis (diethylaminomethyl) - 3,3'-dihydroxyphenyl ether
4,3' - bis (diethylaminomethyl) - 3,4'-dihydroxyphenyl ether If other amines are used, e. g., dimethylamine, dipropylamine, dibutylamine, dihydroxyethylamine, ethylamine, hydroxyethylamine, the corresponding analogs of the above compounds may be obtained.

EXAMPLE III

*Preparation of 3,3'-bis(dimethylaminomethyl)-4,4'-dihydroxy-5,5'-diallylphenyl ether dihydrochloride*

To a solution of 8 g. of 3,3'-diallyl-4,4'-dihydroxyphenyl ether in 40 cc. of alcohol is added a solution of 2.6 g. of paraformaldehyde and 12.6 g. of 33% aqueous dimethylamine in 25 cc. of alcohol. The mixture is heated at refluxing temperature for one hour. After the solvent is removed, the residue is taken up in ether and treated with alcoholic hydrogen chloride. The precipitated crystalline dihydrochloride is collected and washed with dry ether; M. P. 238°. This compound has the formula:

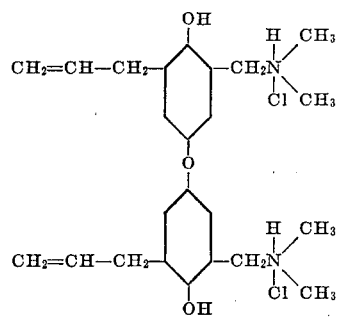

Instead of using a diallyl dihydroxy diphenyl ether as the starting material, other mono-alkyl or di-alkyl dihydroxy diphenyl ethers may also be used such for example as methyl, ethyl, propyl, butyl, amyl and hexyl dihydroxy diphenyl ethers thereby obtaining in the form of the free base or its acid addition salts analogous new compounds including, by way of example only, the following:

3,3' bis (dimethylaminomethyl)-4,4'-dihydroxy-5,5'-dimethylphenyl ether.
3,3' bis (dimethylaminomethyl) - 4,4'-dihydroxy-5,5'-diethylphenyl ether.

What we claim as our invention is:

1. A compound of the class consisting of a free base and its acid addition salts, said free base having the following formula:

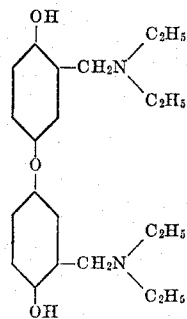

2. The compound having the formula:

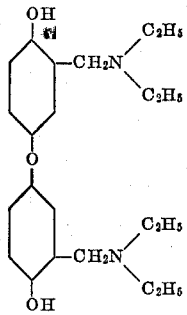

3. A compound of the class consisting of a free base and its acid addition salts, said free base having the following formula:

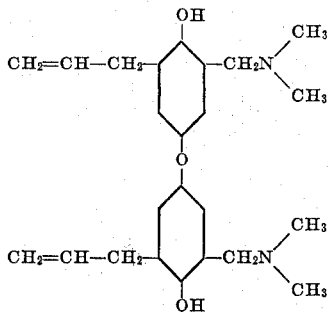

4. The compound having the formula:

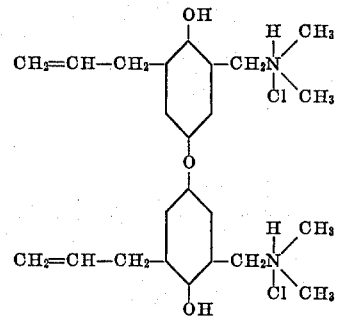

5. A compound of the class consisting of a free base and its acid addition salts, said free base having the following formula:

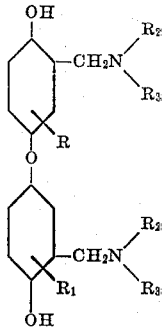

where $R$ and $R_1$ are the same members of the class consisting of hydrogen, alkyl, and alkenyl, both $R_2$ groups are the same member of the class consisting of hydrogen and alkyl containing not more than six carbon atoms, and $R_3$ is alkyl containing not more than six carbon atoms.

ELDON M. JONES.
ALBERT L. RAWLINS.
JOSEPH H. BURCKHALTER.
WALTER F. HOLCOMB.

REFERENCES CITED

The following references are of record in the file of this patent:

UNITED STATES PATENTS

| Number | Name | Date |
| --- | --- | --- |
| 2,036,916 | Bruson | Apr. 7, 1936 |
| 2,045,517 | Bruson | June 23, 1936 |
| 2,063,151 | Dahlen | Dec. 8, 1936 |
| 2,220,835 | Bruson | Nov. 5, 1940 |
| 2,260,967 | Bruson | Oct. 28, 1941 |